United States Patent
Kusada et al.

(10) Patent No.: US 11,539,101 B2
(45) Date of Patent: Dec. 27, 2022

(54) NONAQUEOUS ELECTROLYTE SECONDARY BATTERY

(71) Applicants: Panasonic Corporation, Kadoma (JP); SANYO Electric Co., Ltd., Daito (JP)

(72) Inventors: Hideo Kusada, Hyogo (JP); Takafumi Tsukagoshi, Hyogo (JP); Shinsuke Yoshida, Hyogo (JP)

(73) Assignees: PANASONIC HOLDINGS CORPORATION, Kadoma (JP); SANYO Electric Co., Ltd., Daito (JP)

(*) Notice: Subject to any disclaimer, the term of this patent is extended or adjusted under 35 U.S.C. 154(b) by 302 days.

(21) Appl. No.: 16/665,201

(22) Filed: Oct. 28, 2019

(65) Prior Publication Data
US 2020/0058914 A1    Feb. 20, 2020

Related U.S. Application Data

(63) Continuation of application No. PCT/JP2018/015014, filed on Apr. 10, 2018.

(30) Foreign Application Priority Data

May 12, 2017  (JP) .............................. JP2017-095744

(51) Int. Cl.
*H01M 50/46* (2021.01)
*H01M 10/0585* (2010.01)
(Continued)

(52) U.S. Cl.
CPC ..... *H01M 50/461* (2021.01); *H01M 10/0585* (2013.01); *H01M 50/411* (2021.01); *H01M 50/449* (2021.01)

(58) Field of Classification Search
CPC .................. H01M 50/449–457; H01M 50/461
See application file for complete search history.

(56) References Cited

U.S. PATENT DOCUMENTS

| | | | |
|---|---|---|---|
| 2006/0269842 A1 | 11/2006 | Ichinose et al. | |
| 2015/0004464 A1* | 1/2015 | Okuno ................ | H01M 50/463 429/143 |

(Continued)

FOREIGN PATENT DOCUMENTS

| | | |
|---|---|---|
| JP | 2007-12598 A | 1/2007 |
| JP | 2011-23186 A | 2/2011 |

(Continued)

OTHER PUBLICATIONS

Translation of International Search Report dated Jun. 12, 2018, issued in counterpart Application No. PCT/JP2018/015014. (1 page).

*Primary Examiner* — Ryan S Cannon
(74) *Attorney, Agent, or Firm* — WHDA, LLP

(57) ABSTRACT

This nonaqueous electrolyte secondary battery is provided with an electrode body that is obtained by alternately laminating a plurality of positive electrodes and a plurality of negative electrodes, with separators being interposed therebetween. Each separator is configured of a porous resin substrate and a porous heat-resistant layer that is formed on one surface of the resin substrate and has a larger surface roughness than the resin substrate. The electrode body comprises: bonding particles that bond a negative electrode and a heat-resistant layer with each other; and bonding particles that bond a positive electrode and a resin substrate with each other. The mass of the bonding particles per unit area in a first interface between the negative electrode and the heat-resistant layer is larger than the mass of the bonding particles per unit area in a second interface between the positive electrode and the resin substrate.

5 Claims, 3 Drawing Sheets

(51) Int. Cl.
H01M 50/411 (2021.01)
H01M 50/449 (2021.01)

(56) References Cited

U.S. PATENT DOCUMENTS

| | | | | |
|---|---|---|---|---|
| 2015/0140403 A1* | 5/2015 | Moon | ............... | H01M 50/449 |
| | | | | 429/144 |
| 2015/0263324 A1 | 9/2015 | Lee et al. | | |
| 2015/0311490 A1 | 10/2015 | Murase et al. | | |
| 2018/0309108 A1* | 10/2018 | Shin | ............... | H01M 50/409 |
| 2020/0136190 A1* | 4/2020 | Yamashita | ........ | H01M 10/0585 |

FOREIGN PATENT DOCUMENTS

| | | | | | |
|---|---|---|---|---|---|
| JP | 2016-522553 A | | 7/2016 | | |
| WO | 2014/081035 A1 | | 5/2014 | | |
| WO | WO-2018027652 A1 * | | 2/2018 | .............. | H01M 2/16 |

\* cited by examiner

NONAQUEOUS ELECTROLYTE SECONDARY BATTERY

TECHNICAL FIELD

The present disclosure relates to a non-aqueous electrolyte secondary battery.

BACKGROUND ART

Conventionally, a non-aqueous electrolyte secondary battery comprising a laminated electrode assembly that includes a plurality of positive electrodes and a plurality of negative electrodes alternately laminated with a separator interposed therebetween has been widely known. In a laminated electrode assembly, since position displacement of a separator may be generated during manufacturing or use of a battery, there is a proposition that the position displacement is prevented by bonding the separator to an electrode surface (for example, see Patent Literature 1). Patent Literature 1 discloses a method for forming an adhesive layer interposed between a separator and an electrode using specific adhesive particles.

In addition, Patent Literature 2 discloses a non-aqueous electrolyte secondary battery in which a resin separator and a porous heat-resistant layer are interposed between a positive electrode and a negative electrode. While Patent Literature 2 discloses forming the heat resistant layer on a surface of the positive electrode or the negative electrode, a separator having a heat resistant layer formed on a surface of the separator is also known.

CITATION LIST

Patent Literature

PATENT LITERATURE 1: International Publication No. WO2014/081035
PATENT LITERATURE 2: Japanese Unexamined Patent Application Publication No. 2007-12598

SUMMARY

Meanwhile, when a separator in which a heat resistant layer is formed on one surface of the separator is bonded to an electrode using adhesive particles, it is assumed that sufficient adhesion force cannot be secured because the surface of the heat resistant layer has large irregularities and the adhesive particles completely enter a concave part of the heat resistant layer. In this case, if adhesion conditions such as a pressure and a temperature during bonding are changed to increase adhesion force between the heat resistant layer and the electrode, the adhesive particles may be significantly crushed at the interface between the electrode and the other surface of the separator to widely cover the surface of the separator, and ion permeability of the separator may be impaired.

An advantage of the present disclosure is to provide, by using a separator having a porous heat-resistant layer formed on one surface of the separator, a non-aqueous electrolyte secondary battery in which both of ion permeability of the separator and adhesiveness between the separator and an electrode are good.

The non-aqueous electrolyte secondary battery according to the present disclosure is a non-aqueous electrolyte secondary battery, comprising an electrode assembly including a plurality of first electrodes and a plurality of second electrodes alternately laminated with a separator interposed therebetween, wherein the separator includes a porous resin base material and a heat resistant layer, the heat resistant layer being formed on one side of the resin base material and having larger surface irregularities than surface irregularities of the resin base material, the electrode assembly has first adhesive particles bonding the first electrodes to the heat resistant layer and has second adhesive particles bonding the second electrodes to the resin base material, a mass of the first adhesive particles per unit area at a first interface between the first electrodes and the heat resistant layer is larger than a mass of the second adhesive particles per unit area at a second interface between the second electrodes and the resin base material.

According to one aspect of the present disclosure, by using a separator having a porous heat-resistant layer formed on one surface of the separator, a non-aqueous electrolyte secondary battery in which both of ion permeability of the separator and adhesiveness between the separator and an electrode are good may be provided.

DESCRIPTION OF EMBODIMENTS

Figure 1:
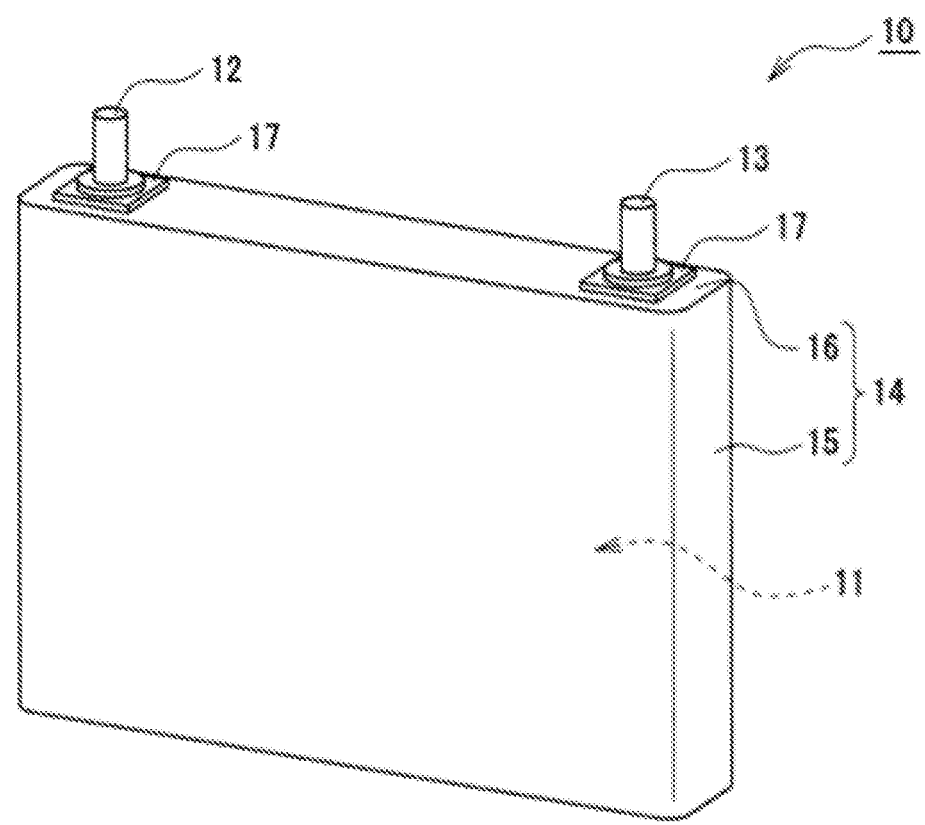
FIG. 1 is a perspective view of a non-aqueous electrolyte secondary battery as one example of an embodiment.

A non-aqueous electrolyte secondary battery according to the present disclosure comprises a separator including a porous resin base material and a porous heat-resistant layer formed on one surface of the resin base material. By virtue of forming the heat resistant layer on a surface of the separator, breakage of the separator due to, for example, a foreign substance mixed thereinto, a nail driven thereinto, or the like is hardly generated and shrinkage of the separator that occurs when temperature rises can be suppressed. By virtue of forming the heat resistant layer only on one surface of the resin base material, the above effect can be obtained while suppressing increase in the thickness of the electrode assembly and reducing material costs.

In the non-aqueous electrolyte secondary battery according to the present disclosure, a particulate adhesive agent is used to bond both sides of the separator to electrodes. Therefore, position displacement of the separator during manufacturing or use of a battery can be prevented without impairing ion permeability of the separator.

However, as described above, when a separator having a heat resistant layer formed on one surface of the separator is used, since a surface state at the resin base material side is significantly different from a surface state at the heat resistant layer side, it is not easy to control adhesion force at both sides of the separator with respect to the respective electrodes within an appropriate range. For example, adhesive particles having been softened or melted during bonding process partly enter a concave part of the surface of the resin base material to exhibit adhesion force by a so-called anchoring effect. However, since the surface of the heat resistant layer has irregularities larger than irregularities on the surface of the resin base material, the anchoring effect is not easily exerted.

That is, since the adhesive particles completely enter the concave part on the surface of the heat resistant layer, adhesion force is not easily exhibited. On the other hand, while adhesion force between the heat resistant layer and an electrode can be enhanced to some extent by increasing a pressure or a temperature during bonding, adhesive particles in this case are significantly crushed at the interface between the resin base material and the electrode to widely cover the surface of the resin base material, and ion permeability of the separator may be inhibited.

As a result of intensive studies to solve the above problem, the present inventors have achieved to solve the above problem by making a mass of the adhesive particles per unit area at the interface between an electrode and the heat resistant layer larger than a mass of the adhesive particles per unit area at the interface between an electrode and the resin base material. In particular, a high capacity non-aqueous electrolyte secondary battery with excellent output characteristics can be realized by controlling a ratio of the number of adhesive particles and a ratio of adhesion force at each of the interfaces within a certain range.

Hereinafter, one example of an embodiment of a positive electrode and the non-aqueous electrolyte secondary battery according to the present disclosure will be described in detail. The drawings referred to in the description of embodiments are schematically illustrated, and dimension ratios and the like of components depicted in the drawings are different from an actual product in some cases. Specific dimension ratios and the like should be determined by taking the following description into consideration. In the present specification, the description like "numerical value (1) to numerical value (2)" means "numerical value (1) or more and numerical value (2) or less" unless otherwise mentioned.

Figure 2:
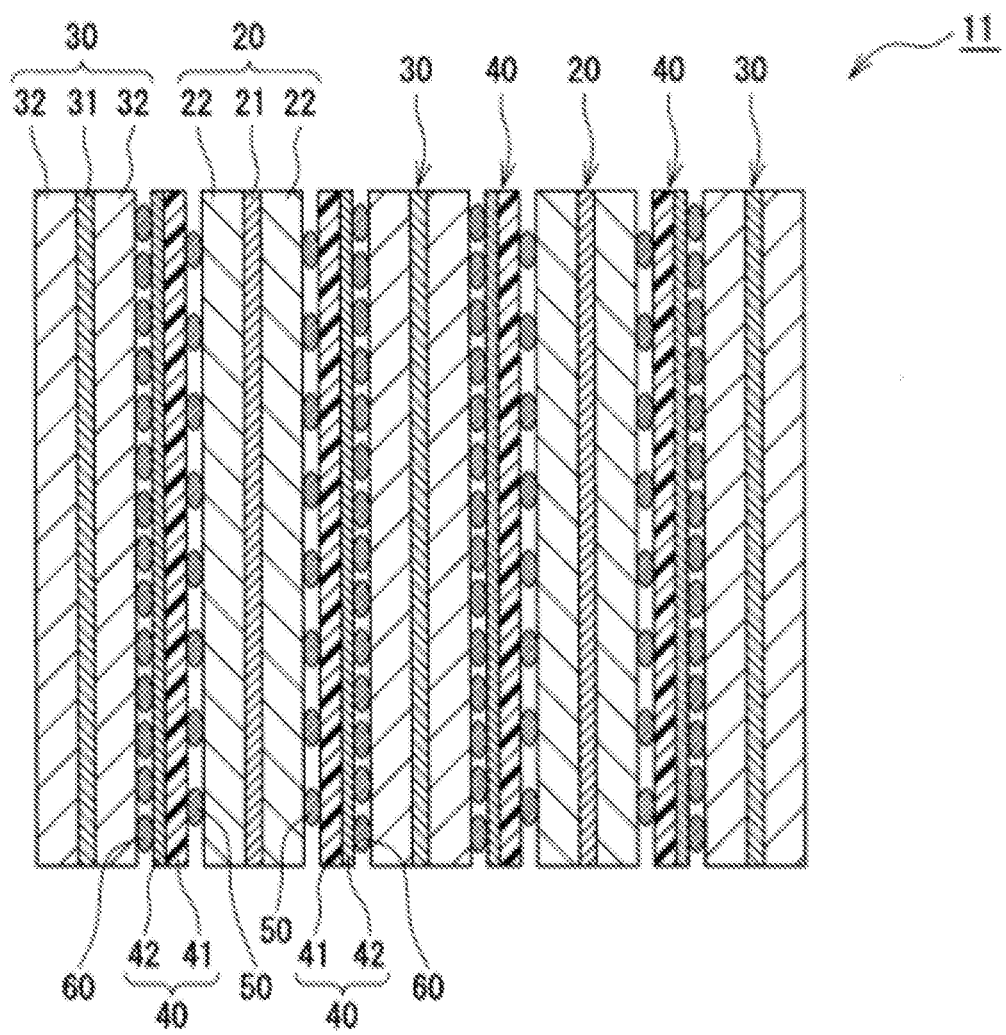
FIG. 2 is a sectional view of an electrode assembly as one example of the embodiment.

FIG. 1 is a perspective view illustrating a non-aqueous electrolyte secondary battery 10 as one example of the embodiment. FIG. 2 is a sectional view of an electrode assembly 11 configuring the non-aqueous electrolyte secondary battery 10. As exemplified in FIG. 1 and FIG. 2, the non-aqueous electrolyte secondary battery 10 comprises a non-aqueous electrolyte (not shown) and an electrode assembly 11 including plural positive electrodes 20 (second electrodes) and plural negative electrodes 30 (first electrodes) alternately laminated with a separator 40 interposed therebetween. A preferable example of the non-aqueous electrolyte secondary battery 10 is a lithium-ion battery.

While the electrode assembly 11 may have a laminated structure in which one separator 40 is zigzagged to be interposed between the positive electrodes 20 and the negative electrodes 30, the electrode assembly 11 in the present embodiment comprises plural separators 40. That is, the electrode assembly 11 has a structure in which the plural positive electrodes 20, plural negative electrodes 30, and plural separators 40 are laminated in the following order: a negative electrode 30, a separator 40, a positive electrode 20, and a separator 40. Negative electrodes 30 are generally arranged as electrodes at both ends of the electrode assembly 11 in the laminating direction.

While details will be described later, the separator 40 includes a porous resin base material 41 and a porous heat-resistant layer 42 formed on one side of the resin base material 41. That is, in the electrode assembly 11, one of the positive electrode 20 and the negative electrode 30 faces the resin base material 41 of the separator 40, and the other of the positive electrode 20 and the negative electrode 30 faces the heat resistant layer 42 of the separator 40. While the separator 40 is provided so that the heat resistant layer 42 faces the negative electrode 30 side in the mode exemplified in FIG. 2, the separator 40 may be provided so that the heat resistant layer 42 faces the positive electrode 20 side.

In the electrode assembly 11, each of the separators 40 is bonded to an adjacent positive electrode 20 and an adjacent negative electrode 30 using a particulate adhesive agent. Therefore, position displacement of the separators 40 during manufacturing and use of a battery can be prevented. In addition, by using a particulate adhesive agent, adhesion force can be obtained while securing good ion permeability of the separator 40. The electrode assembly 11 has adhesive particles 50 (second adhesive particles) which bond the positive electrode 20 to the resin base material 41 and adhesive particles 60 (first adhesive particles) which bond the negative electrode 30 to the heat resistant layer 42.

The non-aqueous electrolyte includes a non-aqueous solvent and an electrolyte salt dissolved in the non-aqueous solvent. The non-aqueous electrolyte is not limited to a liquid electrolyte (non-aqueous electrolyte solution) and may be a solid electrolyte using a gel polymer or the like. Esters such as ethylene carbonate (EC), dimethyl carbonate (DMC), ethyl methyl carbonate (EMC), diethyl carbonate (DEC), and methyl propionate (MP), ethers, nitriles, amides, a mixed solvent of two or more kinds thereof, and the like can be used as the non-aqueous solvent, for example. The non-aqueous solvent may contain a halogen substitution product in which hydrogen atoms of these solvents are at least partially substituted with a halogen atom such as fluorine. Lithium salts such as $LiBF_4$ and $LiPF_6$ may be used as the electrolyte salt, for example.

The non-aqueous electrolyte secondary battery 10 comprises a battery case 14 housing the electrode assembly 11 and the non-aqueous electrolyte. The battery case 14 includes a case main body 15 having approximately a box-shape and a sealing body 16 closing an opening part of the case main body 15. The case main body 15 and the sealing body 16 include a metal material mainly containing aluminum, for example. A conventionally known structure is applicable to the battery case 14. While FIG. 1 exemplifies a square battery, the non-aqueous electrolyte secondary battery 10 is not limited to a square battery and may be a so-called laminated battery comprising an exterior body including a laminate film, for example.

A positive electrode terminal 12 which is electrically connected to each of the positive electrodes 20 and a negative electrode terminal 13 which is electrically connected to each of the negative electrodes 30 are provided on the sealing body 16. A positive electrode lead part on which a surface of a positive electrode current collector 21 is exposed is connected to the positive electrode terminal 12 directly or via another conductive member. A negative electrode lead part on which a surface of a negative electrode current collector 31 is exposed is connected to the negative electrode terminal 13 directly or via another conductive member.

A through hole (not shown) is formed at each end in the horizontal direction of the sealing body 16, and the positive electrode terminal 12 and the negative electrode terminal 13 or the conductive members connected to the respective terminals are inserted into the battery case 14 through the respective through holes. Each of the positive electrode terminal 12 and the negative electrode terminal 13 is fixed to the sealing body 16 via an insulating member 17 provided at each of the through holes, for example. The sealing body 16 is generally provided with a gas discharging mechanism (not shown).

Hereinafter a configuration of the electrode assembly 11 will be described in more detail.

[Positive Electrode (Second Electrode)]

As exemplified in FIG. 2, the positive electrode 20 comprises the positive electrode current collector 21 and a positive electrode mixture layer 22 formed on the current collector. Foil of a metal (such as aluminum) which is stable in a potential range of the positive electrode 20, a film with the metal disposed at a surface layer thereof, and the like can be used as the positive electrode current collector 21. The positive electrode mixture layer 22 preferably includes a positive electrode active material, a conductive agent, and a binder. The positive electrode mixture layer 22 is generally formed at both sides of the positive electrode current collector 21. The positive electrode 20 can be produced by, for example, applying positive electrode mixture slurry including the positive electrode active material, the conductive agent, the binder, and others to the positive electrode current collector 21 and drying the resulting coating film followed by rolling to form the positive electrode mixture layer 22 on each side of the current collector.

A lithium-containing transition metal oxide is preferably used as the positive electrode active material. A metal element included in the lithium-containing transition metal oxide is, for example, at least one selected from magnesium (Mg), aluminum (Al), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), yttrium (Y), zirconium (Zr), tin (Sn), antimony (Sb), tungsten (W), lead (Pb), and bismuth (Bi). Among them, at least one selected from Co, Ni, Mn, and Al is preferably included in the lithium-containing transition metal oxide.

Examples of the conductive agent include carbon materials such as carbon black (CB), acetylene black (AB), Ketjenblack, and graphite. In addition, examples of the binder include fluorocarbon resins such as polytetrafluoroethylene (PTFE) and polyvinylidene fluoride (PVdF), polyacrylonitrile (PAN), polyimide resins, acrylic resins, polyolefin resins. These may be used singly or in combinations of two or more thereof

[Negative Electrode (First Electrode)]

The negative electrode 30 comprises the negative electrode current collector 31 and a negative electrode mixture layer 32 formed on the current collector. Foil of a metal (such as copper) which is stable in a potential range of the negative electrode 30, a film with the metal disposed at a surface layer thereof, and the like can be used as the negative electrode current collector 31. The negative electrode mixture layer 32 preferably includes a binder in addition to a negative electrode active material. The negative electrode mixture layer 32 is generally formed at both sides of the negative electrode current collector 31. The negative electrode 30 can be produced by, for example, applying negative electrode mixture slurry including the negative electrode active material, the binder, and others to the negative electrode current collector 31 and drying the resulting coating film followed by rolling to form the negative electrode mixture layer 32 on each side of the current collector.

The negative electrode active material is not particularly limited as long as the material can reversibly intercalate and deintercalate lithium ions, and carbon materials such as natural graphite and artificial graphite, a metal capable of being alloyed with lithium such as silicon (Si) and tin (Sn), an alloy including a metal element such as Si and Sn, a composite oxide, and the like can be used as the negative electrode active material, for example. The negative electrode active material may be used singly or in combinations of two or more thereof.

As the binder included in the negative electrode mixture layer 32, fluorocarbon resins, PAN, polyimide resins, acrylic resins, polyolefin resins, and the like can be used similarly to the case of the positive electrode 20. When the negative electrode mixture slurry is prepared using an aqueous solvent, styrene-butadiene rubber (SBR), carboxymethyl cellulose (CMC) or a salt thereof, polyacrylic acid (PAA) or a salt thereof, polyvinyl alcohol (PVA), and the like may be used.

[Separator/Adhesive Particles]

The separator 40 includes the porous resin base material 41 and the porous heat-resistant layer 42 formed on one side of the resin base material 41 as described above. By virtue of providing the heat resistant layer 42, breakage of the separator 40 due to, for example, a foreign substance mixed thereinto, a nail driven thereinto, or the like is hardly generated and shrinkage of the separator 40 that occurs when temperature rises can be suppressed. In order to enhance cost-effectiveness while suppressing increase in the thickness of the electrode assembly 11, the heat resistant layer 42 is preferably formed only on one surface of the resin base material 41.

The porous resin base material 41 independently serves as a separator. An ion-permeable and insulating porous film is used as the resin base material 41. A thickness of the resin base material 41 is 1 μm to 20 μm, for example. Polyethylene, polypropylene, an ethylene-propylene copolymer, and an olefin resin such as a copolymer with ethylene, propylene, or another α-olefin can be exemplified as a material for the resin base material 41. A melting point of the resin base material 41 is generally 200° C. or lower.

While the porous film configuring the resin base material 41 has a number of pores for allowing lithium ions to permeate, irregularities on the surface of the porous film are smaller than the surface irregularities of the heat resistant layer 42, and the surface of the porous film is flat compared to the heat resistant layer 42. A size (maximum length) of the pores or a concave part existing on the surface of the resin base material 41 is, for example, less than 0.5 μm and preferably less than 0.3 μm.

The porous heat-resistant layer 42 may include a resin (such as an aramid resin, a polyimide, a polyamide-imide, for example) which has a higher melting point or softening point than that of the resin included in the resin base material 41, but the porous heat-resistant layer 42 preferably includes an inorganic compound as a main component. The heat resistant layer 42 preferably includes insulating inorganic compound particles and a binder binding the particles to each other and binding the particles to the resin base material 41. The heat resistant layer 42 has also ion permeability and electrical insulation properties as with the resin base material 41. A thickness of the heat resistant layer 42 is, for example, 1 μm to 10 μm and preferably 1 μm to 6 μm.

At least one selected from alumina, boehmite, silica, titania, and zirconia can be used as the inorganic compound particles for the main component of the heat resistant layer 42, for example. Among them, alumina or boehmite is preferably used. A contained amount of the inorganic compound particles is preferably 85% by mass to 99.9% by mass and more preferably 90% by mass to 99.5% by mass based on the mass of the heat resistant layer 42.

A shape of the inorganic compound particles is not particularly limited, and spherical particles, square columnar particles, and the like can be used, for example. An average particles diameter of spherical particles or an average length of one side of square columnar particles is preferably 0.1 μm to 1.5 μm and more preferably 0.5 μm to 1.2 μm. When the particle diameter of the inorganic compound particles is within the above range, a heat resistant layer 42 which has good ion permeability and which is excellent in durability can be formed. The average particle diameter or average length of one side of the inorganic compound particles is measured by observing the surface of the heat resistant layer 42 using a scanning electron microscope (SEM). In particular, 100 inorganic compound particles in a SEM image of the heat resistant layer 42 are randomly selected, and the circumscribed circle diameters or lengths of one side of respective particles are measured and averaged to calculate the average particle diameter or average length of one side of the inorganic compound particles.

The same binders exemplified as those included in the positive electrode mixture layer 22 and the negative electrode mixture layer 32, such as fluorocarbon resins including PVdF and SBR can be used as the binder included in the heat resistant layer 42, for example. A contained amount of the binder is preferably 0.1% by mass to 15% by mass and more preferably 0.5% by mass to 10% by mass based on the mass of the heat resistant layer 42. The heat resistant layer 42 is formed by, for example, applying slurry containing inorganic compound particles and a binder to one side of a porous film configuring the resin base material 41, and drying the resulting coating film. By virtue of forming the heat resistant layer 42 on the resin base material 41 as described above, a groove or a concave part is formed between adjacent inorganic compound particles on the surface of the heat resistant layer 42.

As described above, the separator 40 is bonded to each of the positive electrode mixture layer 22 of the positive electrode 20 and the negative electrode mixture layer 32 of the negative electrode 30 using the adhesive particles 50, 60 as a particulate adhesive agent. In the present embodiment, the resin base material 41 of the separator 40 is bonded to the positive electrode mixture layer 22 by the adhesive particles 50, and the heat resistant layer 42 of the separator 40 is bonded to the negative electrode mixture layer 32 by the adhesive particles 60.

That is, the electrode assembly 11 comprises an adhesive layer formed by the adhesive particles 50, 60 between the separator 40 and each electrode. A thickness of the adhesive layer is, for example, 0.1 μm to 1 μm, or 0.2 μm to 0.9 μm and is decided according to an amount of the adhesive particles 50, 60, a particle diameter thereof, and the like. The adhesive layer is formed by, for example, applying slurry containing the adhesive particles 50, 60 to the surface of the separator 40 followed by drying. A dispersion called emulsion in which fine adhesive particles are dispersed in water can be used as the slurry of the adhesive particles 50, 60. In this case, a separator 40 with adhesive layers in which an adhesive layer including the adhesive particles 50, 60 is formed on each side of the separator 40 is obtained.

The electrode assembly 11 is obtained by laminating the negative electrode 30/separator 40 with adhesive layers/positive electrode 20/separator 40 with adhesive layers in this order and hot-pressing the resulting laminate. While adhesion force between the separator 40 and each of the electrodes can be adjusted by changing hot-pressing conditions such as a temperature, pressure, and pressure application time, hot-pressing conditions for an interface Y between the separator 40 and the positive electrode 20 cannot be made different from hot-pressing condition for an interface X between the separator 40 and the negative electrode 30.

Mutually different kinds of adhesive particles may be used for the adhesive particles 50 and the adhesive particles 60, respectively. However, taking productivity and the like into consideration, adhesive particles of the same kind are preferably used. That is, adhesive particles of the same kind are preferably present between the resin base material 41 and the positive electrode 20 and between the heat resistant layer 42 and the negative electrode 30. The adhesive particles of the same kind herein refer to those provided as the same manufactured product, for example, and may be different in production lots.

An average particle diameter of the adhesive particles 50, 60 is, for example, 0.1 μm to 1 μm and preferably 0.5 μm to 0.7 μm. The average particle diameter of the adhesive particles 50, 60 is measured by observing the surface of the separator 40 using a SEM as with the average particle diameter of the inorganic compound particles included in the heat resistant layer 42. The average particle diameter of the adhesive particles 50, 60 is smaller than the average particle diameter of the inorganic compound particles configuring the heat resistant layer 42, for example. Therefore, the adhesive particles 60 may completely enter the concave part present on the surface of the heat resistant layer 42 in some cases. Meanwhile, the average particle diameter of the adhesive particles 50 is larger than the groove or concave part present on the surface of the resin base material 41, for example.

The adhesive particles 50, 60 are preferably melted or softened during the hot-pressing process described above. By allowing the adhesive particles 50, 60 to be melted or softened, the particles are tightly bonded to the surfaces of the separator 40 and each of the electrodes, and good adhesiveness is obtained. The adhesive particles 50, 60 include a resin having a glass transition temperature equal to or less than room temperature (25° C.), for example. Acrylic polymers, diene polymers, polyurethanes, and the like can be exemplified as the resin included in the adhesive particles 50, 60. In particular, particulate polymers disclosed in Patent Literature 1 described above can be used. Among them, acrylic polymers are preferable.

In the electrode assembly 11, a mass of the adhesive particles 60 per unit area at the interface X between the negative electrode mixture layer 32 of the negative electrode 30 and the heat resistant layer 42 is larger than a mass of the adhesive particles 50 per unit area at the interface Y between the positive electrode mixture layer 22 of the positive electrode 20 and the resin base material 41. The mass of the adhesive particles 60 per unit area at the interface X can be calculated by counting the number of the adhesive particles 60 attached to the surface of the negative electrode mixture layer 32 and the surface of the heat resistant layer 42, and multiplying the total volume of the particles by the specific gravity of the particles. The mass of the adhesive particles 50 per unit area at the interface Y can be also calculated by a similar manner.

Since a surface state of the resin base material 41 of the separator 40 is significantly different from a surface state of the heat resistant layer 42 of the separator 40, it is not easy to secure good adhesion force at both sides of the separator 40 with respect to the electrodes. However, when the relationship: the mass of the adhesive particles 50<the mass of the adhesive particles 60 is satisfied, good adhesion force can be secured at both sides of the separator 40 without impairing battery performance. Adhesion force at the interfaces X, Y can also be made equal, for example. When the separator 40 with adhesive layers is used, the mass of the adhesive particles 60 present on the surface of the heat resistant layer 42 is required to be larger than the mass of the adhesive particles 50 present on the surface of the resin base material 41.

The mass of the adhesive particles 50 per unit area at the interface Y between the positive electrode mixture layer 22 and the resin base material 41 is preferably 0.1 g/m² or more and 0.8 g/m² or less and more preferably 0.2 g/m² or more and 0.6 g/m² or less. When the mass of the adhesive particles 50 at the interface Y is within the above range, good ion permeability of the separator 40 can be maintained, and good adhesiveness with the positive electrode mixture layer 22 can be secured without impairing battery performance. The mass of the adhesive particles 60 per unit area at the interface X between the negative electrode mixture layer 32 and the heat resistant layer 42 is 0.2 g/m² to 2.0 g/m², for example.

In addition, (A) the number of the adhesive particles 60 per unit area at the interface X is larger than (B) the number of the adhesive particles 50 per unit area at the interface Y. When adhesive particles of the same kind are used for the adhesive particles 50 and the adhesive particles 60 in order to improve productivity, both of the mass and the number of particles (A) of the adhesive particles at the interface X are larger than the mass and the number of the particles (B) of the adhesive particles at the interface Y. By virtue of satisfying the relationship: the number of particles (A)>the number of particles (B), good adhesion force can be secured at both sides of the separator 40 without impairing battery performance.

The ratio of the number of particles (A/B) between the number of particles (A) and the number of the particles (B) is preferably 1.01 to 2.5. The ratio of the number of particles (A/B) is more preferably 1.50 to 2.50 and especially preferably 2.00 to 2.50. Both of battery performance such as output characteristics and adhesiveness of the separator 40 are easily achieved by controlling the ratio of the number of particles (A/B) within the above range.

In the electrode assembly 11, each of (S1) the adhesion force between the negative electrode mixture layer 32 and the heat resistant layer 42 and (S2) the adhesion force between the positive electrode mixture layer 22 and the resin base material 41 is preferably 3 N/m or more and less than 10 N/m. When the adhesion force (S1, S2) is less than 3 N/m, adhesion force is not sufficient, and position displacement of the electrodes and the separator 40 is easily generated during manufacturing of the electrode assembly 11, for example. On the other hand, when the adhesion force (S1, S2) is 10 N/m or more, the interfaces X, Y are filled with the adhesive particles 50, 60 and good battery characteristics is difficult to be maintained. The adhesion force (S1, S2) is measured by the peeling test described later.

In addition, the adhesion force ratio (S1/S2) between the adhesion force (S1) and the adhesion force (S2) is preferably 0.5 or more and 1.5 or less. The adhesion force ratio (S1/S2) may be 1.0. In this case, the adhesion force (S1) and the adhesion force (S2) are equal. Both of battery performance such as output characteristics and adhesiveness of the separator 40 are easily achieved by controlling the adhesion force ratio (S1/S2) within the above range.

Figure 3:
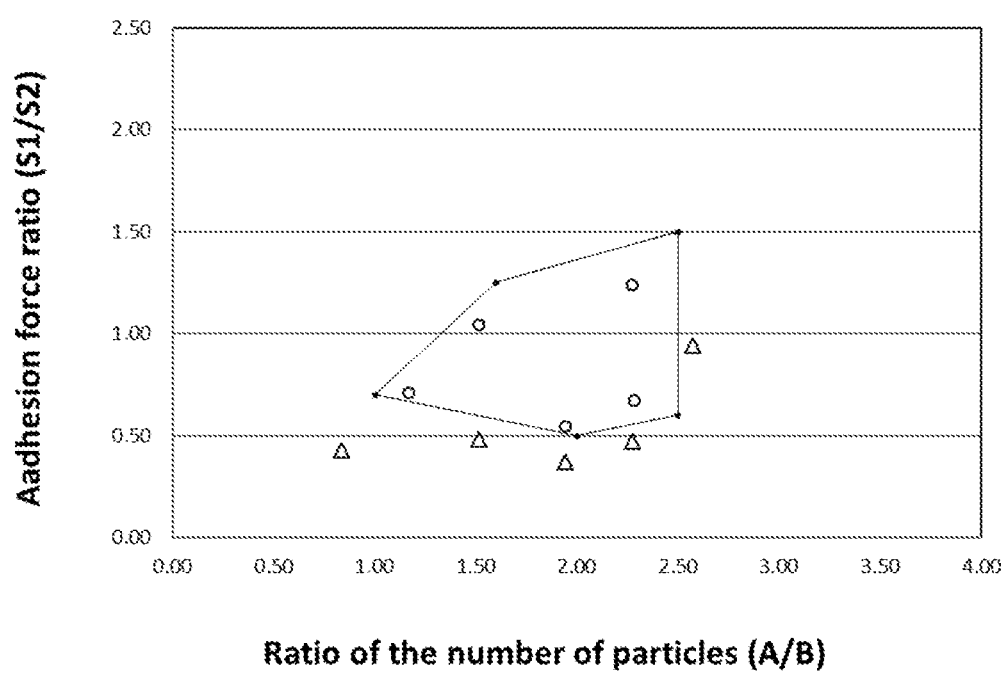
FIG. 3 is a graph showing a preferable range of a ratio of the number of particles (A/B) and an adhesion force ratio (S1/S2).

Further, as illustrated in FIG. 3, the ratio of the number of particles (A/B) and the adhesion force ratio (S1/S2) are preferably adjusted to be within a pentagonal range with the following five points being apexes thereof when the relation thereof is plotted with the ratio of the number of particles (A/B) and the adhesion force ratio (S1/S2) being a horizontal axis and a vertical axis, respectively.

$(A/B=1.01, S1/S2=0.70)$ [1]

$(A/B=2.00, S1/S2=0.50)$ [2]

$(A/B=2.50, S1/S2=0.60)$ [3]

$(A/B=2.50, S1/S2=1.50)$ [4]

$(A/B=1.60, S1/S2=1.25)$ [5]

When the ratio of the number of particles (A/B) and the adhesion force ratio (S1/S2) are within the pentagonal range, a high capacity non-aqueous secondary battery 10 excellent in output characteristics can be realized.

EXAMPLES

The present disclosure will be described in more detail with reference to Examples. However, the present disclosure is not limited to the Examples.

Example 1

[Positive Electrode]

Positive electrode mixture slurry was prepared by mixing 93 parts by mass of a lithium-containing transition metal oxide represented by $LiNi_{1/3}Co_{1/3}Mn_{1/3}O_2$ as a positive electrode active material, 5 parts by mass of acetylene black (AB), and 2 parts by mass of polyvinylidene fluoride (PVdF), and further adding an appropriate amount of N-methyl-pyrrolidone (NMP) thereto. Next, the positive electrode mixture slurry was applied to both sides of a positive electrode current collector made of aluminum foil having a thickness of 15 μm, with lead parts remaining uncoated, and the resulting coating film was dried. The coating film was rolled using a roller and subsequently cut into a predetermined electrode size to prepare a positive electrode in which a positive electrode mixture layer having a thickness of 70 μm was formed on each side of the positive electrode current collector.

[Negative Electrode]

Negative electrode mixture slurry was prepared by mixing 96 parts by mass of graphite powder, 2 parts by mass of carboxymethyl cellulose (CMC), and 2 parts by mass of styrene-butadiene rubber (SBR), and further adding an appropriate amount of water thereto. Next, the negative electrode mixture slurry was applied to both sides of a long negative electrode current collector made of copper foil having a thickness of 8 μm, with lead parts remaining uncoated, and the resulting coating film was dried. The coating film was rolled using a roller and subsequently cut into a predetermined electrode size to prepare a negative electrode in which a negative electrode mixture layer having a thickness of 70 μm was formed on each side of the negative electrode current collector.

[Separator]

A separator including a porous resin base material and a porous heat-resistant layer formed on one side of the resin base material was prepared. The resin base material and the heat resistant layer are as follows.

Resin base material: a porous polyethylene film having a thickness of 12 μm

Heat resistant layer: a layer including, as a main component, square columnar boehmite particles having an average length of one side of 0.5 μm. A number of grooves or convex parts, which have a size capable of allowing adhesive particles having a particle diameter of about 0.5 μm to enter thereinto without significant deformation, were observed on the surface of this layer.

An adhesive particle dispersion (emulsion) including an acrylic polymer as a main component was applied to each side of the separator (long body) and dried. Then, the resulting product was cut into a predetermined separator size to prepare a separator with adhesive layers. At this time, amounts of the emulsion applied were varied between the resin base material side and the heat resistant layer side to set the number of the adhesive particles on the surface of the base material to 46 particles/100 µm$^2$ (basis weight: 0.3 g/m$^2$) and set the number of the adhesive particles on the surface of the heat resistant layer to 54 particles/100 µm$^2$ (basis weight: 0.35 g/m$^2$). The average particle diameter of the adhesive particles measured by SEM observation was 0.5 µm.

[Electrolyte Solution]

Ethylene carbonate (EC), ethyl methyl carbonate (EMC), and dimethyl carbonate (DMC) were mixed at a volume ratio of 3:3:4. Into the mixed solvent, LiPF$_6$ was dissolved at a concentration of 1.2 mol/L to prepare an electrolyte solution.

[Test Cell]

In the order of negative electrode/separator/positive electrode/separator, eight positive electrodes and nine negative electrodes were alternately laminated with a separator disposed at every interface therebetween so that the heat resistant layer of each separator faces the corresponding negative electrode. The resulting laminate was hot-pressed at a pressure of 1.5 MPa for 60 seconds using a hot-pressing apparatus to prepare a laminated electrode assembly. Then, an aluminum tab and a nickel tab were welded to a lead part of the positive electrode and a lead part of the negative electrode, respectively, using an ultrasonic welding machine. This electrode assembly was wrapped with an insulating laminate film, and three sides of the film were heat-welded with the remaining one side unwelded followed by vacuum drying at 80° C. for four hours.

Next, in a dry box the inside of which was an argon gas atmosphere, the electrolyte solution was injected into the exterior body made of the laminate film, and an opening part of the exterior body (the remaining one side) was heat-welded to prepare a test cell.

Example 2

An electrode assembly and a test cell were prepared in a similar manner to Example 1 except that the mass (basis weight) and the number of particles per unit area of the adhesive particles on each of the base material surface and the heat resistant layer surface of the separator were changed to those shown in Table 1.

Example 3

An electrode assembly and a test cell were prepared in a similar manner to Example 1 except that the mass (basis weight) and the number of particles per unit area of the adhesive particles on each of the base material surface and the heat resistant layer surface of the separator were changed to those shown in Table 1, and that the hot-pressing time was changed to 90 seconds.

Example 4

An electrode assembly and a test cell were prepared in a similar manner to Example 1 except that the mass (basis weight) and the number of particles per unit area of the adhesive particles on each of the base material surface and the heat resistant layer surface of the separator were changed to those shown in Table 1, and that the hot-pressing time was changed to 120 seconds.

Example 5

An electrode assembly and a test cell were prepared in a similar manner to Example 1 except that the mass (basis weight) and the number of particles per unit area of the adhesive particles on each of the base material surface and the heat resistant layer surface of the separator were changed to those shown in Table 1, and that the hot-pressing pressure and the hot-pressing time were changed to 5.0 MPa and 30 seconds, respectively.

Reference Example

An electrode assembly and a test cell were prepared in a similar manner to Example 1 except that the adhesive layer was not formed on the surface of the separator and that the hot-pressing was performed under the following condition: a temperature of 70° C., a pressure of 5.0 MPa, and a time of 60 seconds.

Example 6

An electrode assembly and a test cell were prepared in a similar manner to Example 5 except that the mass (basis weight) and the number of particles per unit area of the adhesive particles on each of the base material surface and the heat resistant layer surface of the separator were changed to those shown in Table 1.

Example 7

An electrode assembly and a test cell were prepared in a similar manner to Example 4 except that the mass and the number of particles per unit area of the adhesive particles on each of the base material surface and the heat resistant layer surface of the separator were changed to those shown in Table 1.

Example 8

An electrode assembly and a test cell were prepared in a similar manner to Example 5 except that the mass and the number of particles per unit area of the adhesive particles on each of the base material surface and the heat resistant layer surface of the separator were changed to those shown in Table 1, and that the pressure application time was changed to 60 seconds.

Example 9

An electrode assembly and a test cell were prepared in a similar manner to Example 5 except that the mass and the number of particles per unit area of the adhesive particles on each of the base material surface and the heat resistant layer surface of the separator were changed to those shown in Table 1, and that the pressure application time was changed to 40 seconds.

Example 10

An electrode assembly and a test cell were prepared in a similar manner to Example 4 except that the mass and the number of particles per unit area of the adhesive particles on each of the base material surface and the heat resistant layer surface of the separator were changed to those shown in Table 1.

Performance evaluations were conducted on the electrode and the test cell of each of Examples according to the following methods. Evaluation results are shown in Table 1. Battery characteristics of the test cell of each of Examples were evaluated with the test cell of Reference Example, which has no adhesiveness between the separator and each electrode, as a reference (100%).

[Evaluation on Charge and Discharge Characteristics (Capacity)]

A test cell was charged at a constant current of 60 mA for one hour as pretreatment. Then, the test cell was left in a thermostatic chamber at 60° C. for one day to remove specific gas generated during initial charging. At this time, the generated gas was collected at the edge part of the exterior body, the exterior body was heat-welded to cut the part in which the gas accumulated away from a housing part of the electrode assembly.

The pretreated test cell was charged at a constant current of 200 mV and a constant voltage of 4.2 V (30 mA cut), charging was stopped for 20 minutes, and then the test cell was discharged at a constant current of 600 mA, 120 mA, and 60 mA in turn (2.5 V cut) at intervals of 20 minutes. A value obtained by summing discharge capacities at respective current values was regarded as a capacity of the test cell.

[Evaluation on Output Characteristics]

The pretreated test cell was charged at a constant current of 200 mA and a constant voltage of 4.2 V so that the state of charge (hereinafter referred to as SOC) of the test cell became 50% and subsequently discharged at a constant current for 10 seconds to obtain a discharge current at which voltage reached 3 V, and output of the test cell was calculated by multiplying current by voltage. The voltage of the cell at which SOC became 50% was 3.7 V.

Discharge current at which voltage reached 3 V was obtained as follows. Discharge was performed at a current value (for example, 6000 mA) at which voltage never dropped to 3 V during ten seconds of discharge, and a voltage (for example, 3.1 V) at that time was obtained. Then, charging was performed at 6000 mA so that voltage became 3.7 V, discharge was subsequently performed at a current value (for example, 7000 mA) at which voltage dropped to 3 V or less, a voltage (for example, 2.9 V) at that time was obtained, and the current and voltage were plotted.

[Number of Adhesive Particles and Basis Weight on Separator Surface]

The surfaces (base material surface and heat resistant layer surface) of the separator with adhesive layers were observed by SEM, and the number of adhesive particles present within a range of 100 μm$^2$ in a SEM image was counted, and the counted value was regarded as the number of particles per unit area. In addition, a basis weight (mass per unit area) was calculated based on the number of particles measured by SEM observation regarding the particle diameter per one adhesive particle and the specific gravity of the particles as 0.5 μm and 1.0 g/cm$^3$, respectively. When the number of adhesive particles is measured after the separator has been bonded to each electrode, the number of particles present on the separator surface and the number of particles present on the electrode surface should be combined.

[Adhesion Force Between Separator and Each Electrode]

For each test cell, adhesion force at the bounding surface (interface X) between the heat resistant layer of the separator and the negative electrode and adhesion force at the bounding surface (interface Y) between the base material of the separator and the positive electrode were measured using a desktop test stand (manufactured by NIDEC-SHIMPO CORPORATION, FGS-TV) with a digital force gauge (manufactured by NIDEC-SHIMPO CORPORATION, FGP-5) attached thereto.

The test cell before electrolyte solution injection was disassembled with a bounding surface to be subject to adhesion force measurement remaining, and the disassembled test piece was cut into a 20-millimeter-wide strip. Next, the opposite surface of the bounding surface of the strip test piece to be measured was attached to a plate with double-sided tape. The plate was placed on a jig constrained not to move in the vertical direction and to freely move in the plate surface direction. Subsequently, an end part of the separator test piece was nipped by a clip attached to the tip of the digital force gauge to pull the test piece up in the 90° direction with respect to the electrode surface, and force acting on the digital force gauge at this time was measured. When the measured value of the digital force gauge was 0.2 N, adhesion force at the measured bonding surface is 0.2× 1000/20=10 N/m. Adhesion force was measured using an electrode assembly before permeation of electrolyte solution, adhesion force ratios shown in Table 1 below are assumed to be kept unchanged before and after permeation.

TABLE 1

| | Separator with adhesive layers | | | | | | | | | | | | |
|---|---|---|---|---|---|---|---|---|---|---|---|---|---|
| | Number of particles (particles/100 μm$^2$) | | Basis weight (g/m$^2$) | | | Adhesion force (N/m) | | | Hot-pressing conditions | | | Battery performance evaluation | |
| | Base material B | Heat resistant layer A | Base material | Heat resistant layer | Ratio A/B | Base material S2 | Heat resistant layer S1 | Ratio S1/S2 | Temperature | Pressure | Time | Capacity | Output |
| Example 1 | 46 | 54 | 0.3 | 0.35 | 1.17 | 4.5 | 3.2 | 0.71 | 70° C. | 1.5 MPa | 60 s | 99.7% | 98.9% |
| Example 2 | 50 | 76 | 0.33 | 0.5 | 1.52 | 5 | 5.2 | 1.04 | 70° C. | 1.5 MPa | 60 s | 99.2% | 98.3% |
| Example 3 | 34 | 76 | 0.22 | 0.5 | 2.27 | 4.6 | 5.7 | 1.24 | 70° C. | 1.5 MPa | 90 s | 99.2% | 98.3% |
| Example 4 | 54 | 122 | 0.35 | 0.8 | 2.29 | 5.2 | 3.5 | 0.67 | 70° C. | 1.5 MPa | 120 s | 97.6% | 90.0% |
| Example 5 | 28 | 53 | 0.18 | 0.35 | 1.94 | 6.4 | 3.5 | 0.55 | 70° C. | 5.0 MPa | 30 s | 100% | 94.4% |
| Reference Example | — | — | — | — | — | 0 | 0 | — | 70° C. | 5.0 MPa | 60 s | 100% | 100% |
| Example 6 | 46 | 38 | 0.3 | 0.25 | 0.83 | 10.5 | 4.5 | 0.43 | 70° C. | 5.0 MPa | 30 s | 99.0% | 87.8% |
| Example 7 | 50 | 76 | 0.33 | 0.5 | 1.52 | 12.4 | 6 | 0.48 | 70° C. | 1.5 MPa | 120 s | 98.1% | 84.4% |
| Example 8 | 28 | 54 | 0.18 | 0.35 | 1.94 | 11.3 | 4.2 | 0.37 | 70° C. | 5.0 MPa | 60 s | 98.6% | 86.7% |

TABLE 1-continued

| | Separator with adhesive layers | | | | | | | | | | | | |
|---|---|---|---|---|---|---|---|---|---|---|---|---|---|
| | Number of particles (particles/100 μm$^2$) | | Basis weight (g/m$^2$) | | | Adhesion force (N/m) | | | Hot-pressing conditions | | | Battery performance evaluation | |
| | Base material B | Heat resistant layer A | Base material | Heat resistant layer | Ratio A/B | Base material S2 | Heat resistant layer S1 | Ratio S1/S2 | Temperature | Pressure | Time | Capacity | Output |
| Example 9 | 34 | 76 | 0.22 | 0.5 | 2.27 | 13 | 6.1 | 0.47 | 70° C. | 5.0 MPa | 40 s | 98.0% | 79.4% |
| Example 10 | 54 | 138 | 0.35 | 0.9 | 2.57 | 5.3 | 5 | 0.94 | 70° C. | 1.5 MPa | 120 s | 93.6% | 86.1% |

FIG. 3 is a graph on which the ratios of the number of particles (A/B) and the adhesion force ratios (S1/S2) shown in Table 1 are plotted with the ratio of the number of particles (A/B) and the adhesion force ratio (S1/S2) being the horizontal axis and the vertical axis, respectively. The test cells of Examples 1 to 5, the ratios of the number of particles (A/B) and the adhesion force ratios (S1/S2) of which are within the pentagonal range shown in FIG. 3, had high capacities and were excellent in output characteristics compared to the test cell of Example 10. In addition, the test cells of Examples 1 to 5 were excellent in output characteristics compared to the test cells of Examples 6 to 9. That is, a high capacity non-aqueous electrolyte secondary battery with excellent output characteristics can be realized by controlling its ratio of the number of particles (A/B) and adhesion force ratio (S1/S2) within the pentagonal range shown in FIG. 3.

It was difficult to achieve an adhesion force ratio (S1/S2) of 1.5 or more while keeping adhesion force (S1, S2) at the interface between the separator and each electrode 3 N/m or more. For example, an adhesion force ratio (S1/S2) of 1.5 or more can be achieved by making the basis weight of adhesion particles at the base material side extremely less than that of the heat resistant layer side and setting hot-pressing conditions to a low pressure and a short time. However, in this case, adhesion force (S1) at the base material side of 3 N/m or more is difficult to be achieved. In addition, it can be easily assumed that if adhesion particles having adhesion force different form adhesion force of the adhesion particles used in Examples are used, a preferable ratio of the number of particles (A/B) and adhesion force ratio (S1/S2) are the same. In addition, the electrode facing the heat resistant layer was the negative electrode in Examples, similar results are obtained when the electrode facing the heat resistant layer is changed to the positive electrode.

REFERENCE SIGNS LIST 10 non-aqueous electrolyte secondary battery
11 electrode assembly
12 positive electrode terminal
13 negative electrode terminal
14 battery case
15 case main body
16 sealing body
17 insulating member
20 positive electrode
21 positive electrode current collector
22 positive electrode mixture layer
30 negative electrode
31 negative electrode current collector
32 negative electrode mixture layer
40 separator
41 resin base material
42 heat resistant layer
50, 60 adhesive particles

The invention claimed is:

1. A non-aqueous electrolyte secondary battery, comprising an electrode assembly including a plurality of first electrodes and a plurality of second electrodes alternately laminated with a separator interposed therebetween, wherein
the separator includes a porous resin base material and a porous heat-resistant layer, the porous heat-resistant layer being formed on one side of the resin base material and having larger surface irregularities than surface irregularities of the resin base material,
the electrode assembly has:
first adhesive particles bonding the first electrodes to the heat resistant layer; and
second adhesive particles bonding the second electrodes to the resin base material,
a mass of the first adhesive particles per unit area at a first interface between the first electrodes and the heat resistant layer is larger than a mass of the second adhesive particles per unit area at a second interface between the second electrodes and the resin base material,
wherein (A) the number of the first adhesive particles per unit area at the first interface is larger than (B) the number of the second adhesive particles per unit area at the second interface,
wherein a ratio of the number of particles (AB) between the number of first adhesive particles (A) and the number of the second adhesive particles (B) is 1.01 to 2.5, and wherein an average particle diameter of the first adhesive particles is smaller than a concave part present on the surface of the heat resistant layer, and an average particle diameter of the second adhesive particles is larger than a concave part present on the surface of the resin base material.

2. The non-aqueous electrolyte secondary battery according to claim 1, wherein
each of (S1) adhesion force between the first electrode and the heat resistant layer and (S2) adhesion force between the second electrode and the resin base material is 3 N/m or more and less than 10 N/m, and
an adhesion force ratio (S1/S2) between the adhesion force (Si) and the adhesion force (S2) is 0.5 to 1.5.

3. The non-aqueous electrolyte secondary battery according to claim 2, wherein the ratio of the number of particles (A/B) and the adhesion force ratio (S1/S2) are within a pentagonal range having apexes at
[1] (A/B=1.01, S1/S2=0.70),

[2] (A/B=2.00, S1/S2=0.50),
[3] (A/B=2.50, S1/S2=0.60),
[4] (A/B=2.50, S1/S2=1.50), and
[5] (A/B=1.60, S1/S2=1.25).

4. The non-aqueous electrolyte secondary battery according to claim 1, wherein adhesive particles of the same kind are used for the first adhesive particles and the second adhesive particles.

5. The non-aqueous electrolyte secondary battery according to claim 1, wherein the heat resistant layer includes inorganic compound particles having an average particle diameter larger than the average particle diameter of the first adhesive particles.

* * * * *